United States Patent [19]

Jacquelin

[11] 4,132,623

[45] Jan. 2, 1979

[54] DEVICE FOR REGENERATING ZINC

[75] Inventor: Jean Jacquelin, Limours, France

[73] Assignee: Compagnie Generale d'Electricite, Paris, France

[21] Appl. No.: 857,832

[22] Filed: Dec. 5, 1977

[30] Foreign Application Priority Data

Dec. 3, 1976 [FR] France .............................. 76 36512

[51] Int. Cl.² .......................... C25C 7/00; C25C 7/08
[52] U.S. Cl. .................................... 204/275; 204/263
[58] Field of Search ............... 204/257, 260, 272, 275, 204/281, 289, 290 R, 252, 263

[56] References Cited

U.S. PATENT DOCUMENTS

| 3,860,509 | 1/1975 | Emmett, Jr. ......................... 204/281 |
| 3,862,022 | 1/1975 | Hermann ............................. 204/272 |
| 3,941,677 | 3/1976 | Bourne ................................ 204/272 |

*Primary Examiner*—T. M. Tufariello
*Attorney, Agent, or Firm*—Sughrue, Rothwell, Mion, Zinn and Macpeak

[57] ABSTRACT

The invention relates to a method and device for regenerating zinc for use in electric traction batteries. It consists of putting an alkaline solution of zincate in contact with two electrodes at opposite potentials so that zinc dendrites are deposited on protrusions provided on the negative electrode and so that oxygen is evolved on the positive electrode, said zincate solution being, in a first period, called the deposition period, conveyed towards the ends of the protrusions and at a low speed, then in a second period, called the detachment period, conveyed in the opposite direction and at a sufficiently high speed to detach the dendrites from the protrusions.

7 Claims, 13 Drawing Figures

DEVICE FOR REGENERATING ZINC

FIELD OF THE INVENTION

The present invention relates to a method and a device for regenerating zinc from an alkaline zincate solution coming in particular from an electric cell.

BACKGROUND OF THE INVENTION

Ser. No. 707,732, now U.S. Pat. 4,097,357 describes a method of regenerating zinc from an alkaline zincate solution, wherein the solution is in contact with at least two electrodes connected to a D.C. generator so that zinc particles are deposited on the negative electrode and oxygen is evolved at the positive electrode, the method having alternating periods comprising a first period in which the solution is conveyed at a sufficiently low speed (or at zero speed) so that the zinc particles are deposited on the negative electrode and a second period in which the solution is conveyed at a sufficiently high speed for the previously-deposited zinc particles to be detached from the negative electrode.

We have, however, observed that during the deposition periods the zinc particles become partially and randomly detached from the negative electrode.

Although this phenomenon is in no way detrimental to the reliability of the device, it can nonetheless reduce the energy efficiency of the process, while provoking a reduction in the quantity of zinc regenerated.

Preferred embodiments of the present invention mitigate this disadvantage and the advantages of such preferred embodiments will further be brought out and made clear in the detailed description below.

SUMMARY OF THE INVENTION

The present invention therefore provides a method of regenerating zinc from an alkaline zincate solution which is in contact with at least two electrodes connected to a D.C. generator so that zinc particles are deposited on the negative electrode and oxygen is evolved at the positive electrode. The method comprises two alternating periods comprising a deposition period in which the solution is conveyed past the negative electrode in a first direction at a speed which is sufficiently low for the zinc particles to be deposited thereon, and a detachment period in which the solution is conveyed past the negative electrode in the opposite direction at a speed which is sufficiently high for the previously-deposited zinc particles to be detached from the negative electrode.

Embodiments of the present invention are described by way of example with reference to the accompanying drawings.

DESCRIPTION OF PREFERRED EMBODIMENTS

Figure 1:
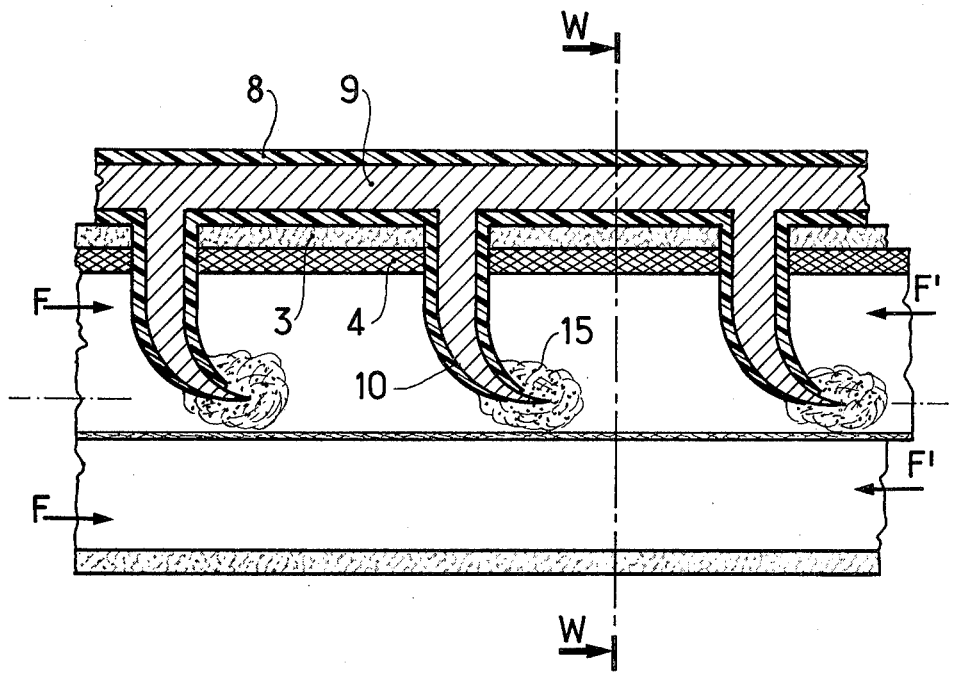
FIG. 1 is a sectional view showing a first preferred embodiment of a zinc regeneration device in accordance with the invention.
Figure 2:
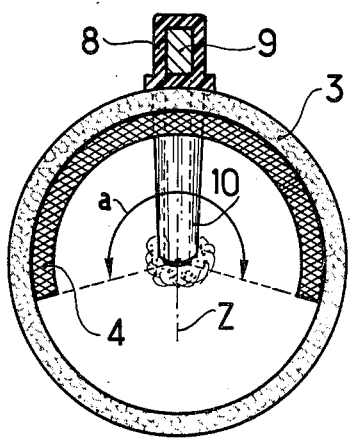
FIG. 2 is a cross-section along a line WW of FIG. 1.

In FIGS. 1 and 2, a zinc regeneration device in accordance with a first preferred embodiment of the invention includes a tubular pipe 3 made of a sealed insulative material as described by the aforementioned prior patent application. The inner surface of the tubular pipe 3 is in contact with a positive electrode 4 which is itself in contact with a flow of zincate solution in potassium hydroxide. Said electrode 4 is formed by a porous metallic layer, for example being made of sintered nickel, possibly supported by a cloth or a perforated metal sheet.

The negative electrode is formed by protrusions 10 disposed at the centre of the sealed and insulative tubular pipe 3, while the positive electrode 4 extends over an arc of the pipe 3 which subtends an angle a at the centre which is at least equal to 180° and whose bisector (Z) is substantially vertical so that the lower inner surface of the pipe is not covered by the positive electrode.

Said protrusions 10 are cylindrical, are made of magnesium and they end in points which are disposed along the axis of the pipe. The protrusions are covered in an insulative layer 8 except for their points. Such points are connected to an insulated base 9 which is disposed on the outside of the tube and is consequently situated on the pipe 3.

Figure 3:
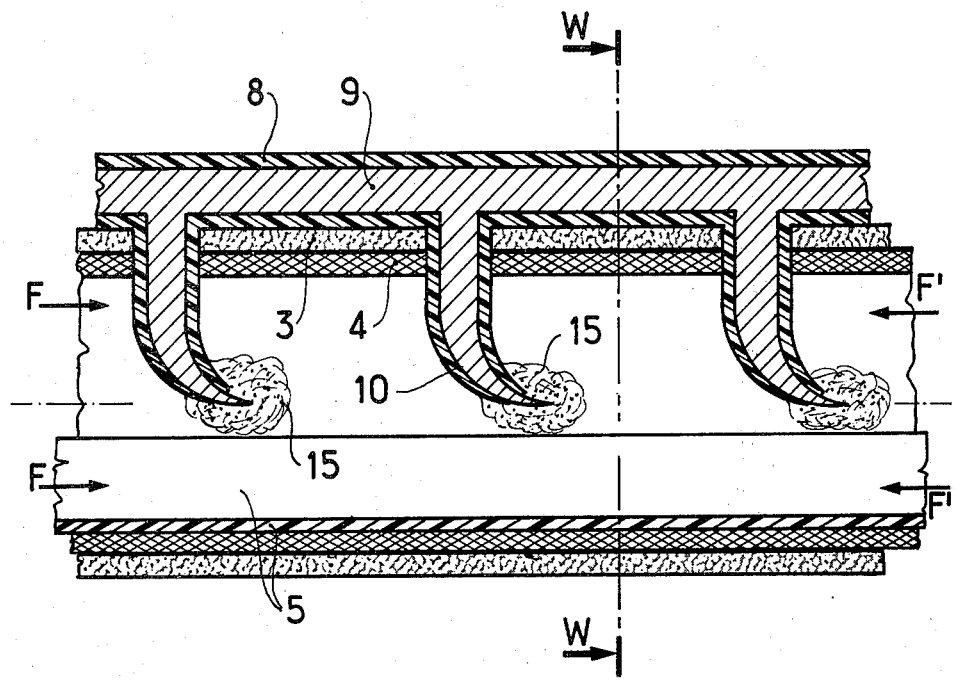
FIG. 3 is a sectional view of a second preferred embodiment of a zinc regeneration device in accordance with the invention.
Figure 4:
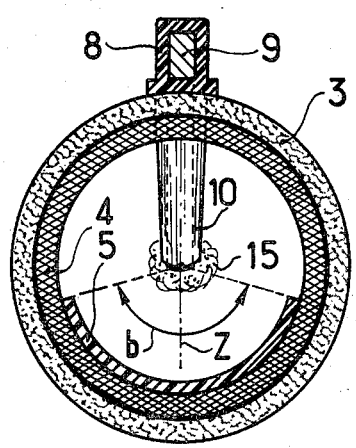
FIG. 4 is a cross-section along the axis WW of FIG. 3.

If the other preferred embodiment illustrated in FIGS. 3 and 4 and also described by the aforementioned application are now considered, it is seen in these figures that the pipe 3 and the positive electrode 4 both have a complete circular cross-section.

However, a layer 5 of impervious insulative material has been deposited on the lower internal part of the electrode 4, such a layer having a cross-section in the form of an arc of a circle delimited by a centre angle b which is at the most equal to 180° and whose bisector Z is substantially vertical.

The structure of the negative electrode is such as previously described and illustrated with reference to FIGS. 1 and 2.

It is seen therefore in these preferred embodiments that the zinc particles which are possibly not entrained by the flow of solution gather together by gravity in the bottom part and cannot in any case whatsoever come into contact with the electrode 4 and cause self-discharge or short-circuit phenomena which could perceptibly disturb the regeneration process.

Further, in some cases, the Applicants have observed that the ends of protrusions which are not tapered but plane or substantially plane make it possible precisely to facilitate the tearing away of the dendrites by the flow of solution subsequent, in particular, to the low adherence of these dendrites on the plane ends in the vicinity of which there is less turbulence of the solution.

Figure 5:
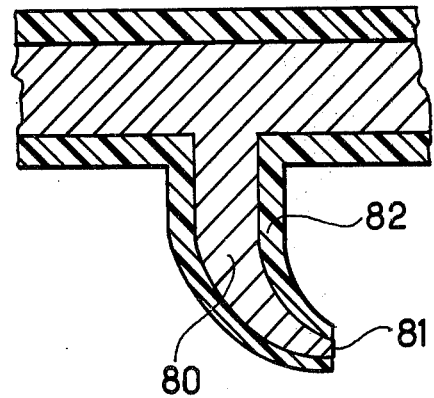
FIG. 5 is an enlarged sectional view of a variant of a protrusion provided in the devices in accordance with the invention.

Consequently, in accordance with a variant such as illustrated in FIG. 5 which has also been previously described by the Applicants in their aforementioned patent application, the protrusions 80 have a plane end 81, the insulation 82 covering the whole of the protrusion, except for the end 81, all other characteristics otherwise remaining identical.

The method according to the invention can be explained clearly as follows, with reference to the above figures.

When a DC voltage is applied to the terminals of the electrodes 9 and 4, the alkaline zincate solution is electrolysed and the zinc is deposited in the form of dendritic particles on the protrusions.

On referring for example to FIGS. 1 to 4, it will be seen that the dendrites 15 are deposited on the points of the protrusions 10.

In this first, or deposition period, the solution is conveyed in the direction of the arrows F' towards the protrusions and at a speed of approximately 0.1 to 0.5 m/s. In the same phase, oxygen is evolved at the positive electrode 4 and is entrained by the solution.

In a second, or detachment period, the zinc dendrites 15 are detached from the protrusions 10 by reversing the direction of the solution, which is therefore conveyed in the direction of the arrows F and at a sufficient speed, for example approximately 1m/s.

Such a sequence can of course be periodically repeated. Further, it should also be stated that after a time of operation of the battery 11 there can nonetheless remain permanently on the protrusions microscopic zinc deposits which can in the long run be detrimental to the tearing away of the dendrites from the protrusions.

To mitigate such a disadvantage, it is sufficient purely and simply to dissolve such deposits periodically by short-circuiting the positive electrode 4 and for example the base 9 connected to the protrusions 10. The electrochemical couple which results therefrom results in a low current which is nevertheless sufficient to dissolve such deposits. Advantageously, this short-circuiting will be effected during said detachment periods.

Figure 6A:
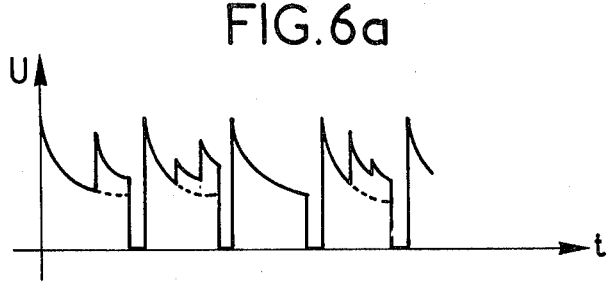
FIG. 6a, 6b, 7a and 7b are plots showing the electrical characteristics of a zinc regeneration device using a prior method.
Figure 9A:
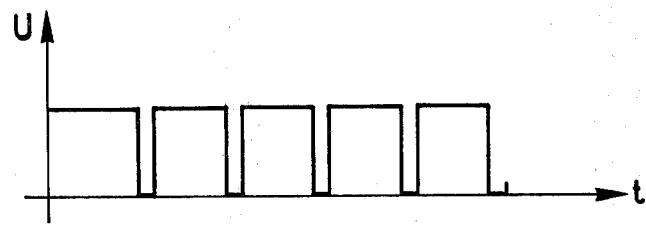
Figure 9B:
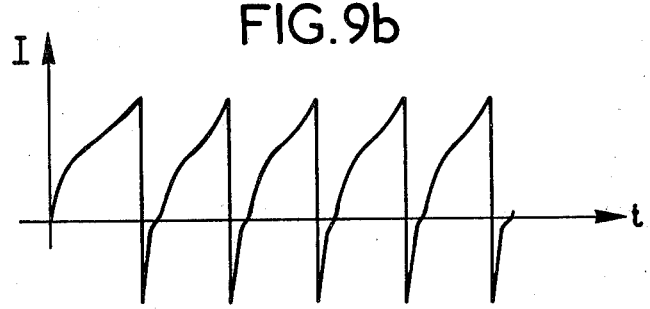

Lastly, with reference to FIGS. 6a and 9b, the previously outlined advantages of the present invention will be illustrated.

It has indeed been stated that the partial and random dissociations of zinc particles on the protrusions, during the deposition periods, is detrimental to its energy efficiency while decreasing the quantity of zinc produced.

Figure 6B:
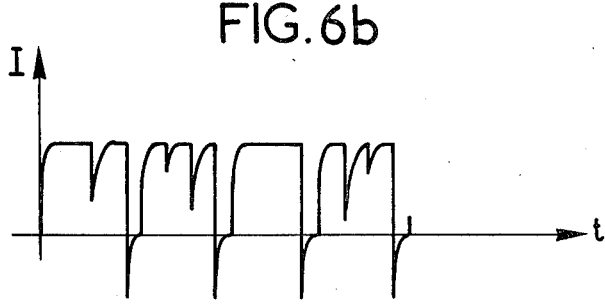

With reference to FIGS. 6a and 6b which represent respectively (for constant current operation) the voltage U and the current I as a function of time t, during the deposition periods for a device using any method it is seen that any inadvertent detachment of zinc results in transient increases of said voltage U and in concomittant transient reductions of said current I.

Figure 7A:
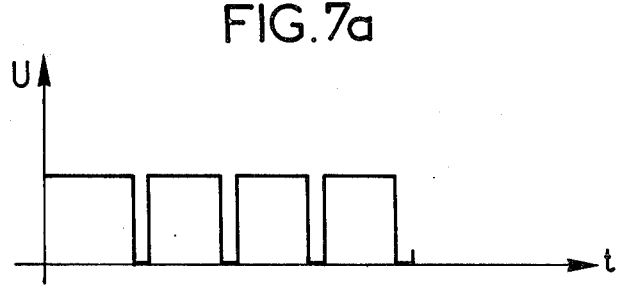
Figure 7B:
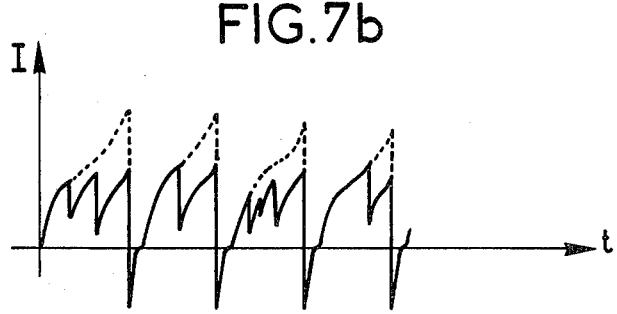

With reference to FIGS. 7a and 7b which show the same parameters but at constant voltage U, it is also seen that inadvertent dissocations cause an irregular current whose average value is lowered thereby.

This results firstly in a reduction of the quantity of zinc regenerated and secondly in a lower energy efficiency.

The method in accordance with the invention makes it possible precisely to avoid such degradation phenomena, as shown in FIGS. 8a to 9b.

Figure 8A:
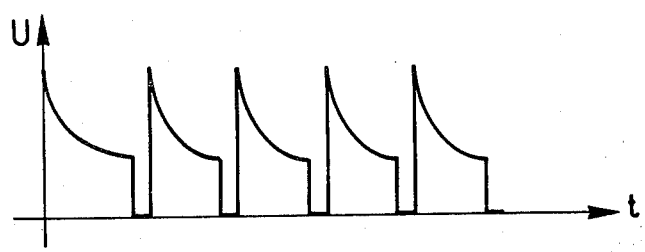
FIG. 8a, 8b, 9a and 9b are plots showing the electrical characteristics of a zinc regeneration device using the method of the invention.
Figure 8B:
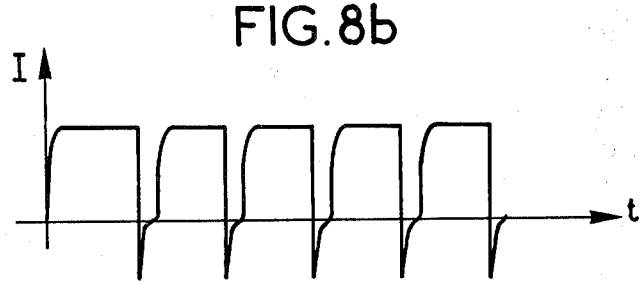

FIGS. 8a and 8b which also show the variations of U and I as a function of time show that these parameters do not have the previously illustrated inadvertent variations.

The same observation applies to FIGS. 9a and 9b.

Such a regular variation of U and I results from the fact that the method in accordance with the invention allows the zinc dendrites which form on the protrusions to remain stable; this advantage results from the direction and the sufficient flow speed of the electrolyte during the depositing phase, which keep the dendrites attached to the protrusions.

It is further observed that the method in accordance with the invention does not substantially increase the adherence of the dendrites, which are hence easily detached from the protrusions during the detachment phase. It is even observed that the dendrites are more compact and have a more regular shape.

Further, such a flow of solution during the deposition periods ensures the evacuation towards the outside of any bubbles of gas formed, this being done by the flow of solution.

It is apparent from these few considerations that the method in accordance with the invention allows a maximum regeneration of zinc for a given energy consumption.

A concrete example of a device and of the method of regeneration of zinc in accordance with the invention will be given hereinbelow.

The device is such as illustrated in FIGS. 1 and 2.

The pipe 3 has an inside diameter of 20 mm and a length of 500 mm. It is made of polyvinyl chloride.

The number of protrusions is 25, their ends having a diameter of 1mm.

The positive electrode 4 is made of sintered nickel, the angle a being 200°.

During a deposition period, the speed of the electrolyte is 0.3 m/s, the current is 25A, the voltage is 2.4 to 3 volts and its duration is 10 minutes.

During a zinc dendrite datachment period, the electrodes are short-circuited, the speed of the electrolyte is 1 m/s and the duration is 1 minute.

The production of zinc is approximately 29 g per hour.

Advantageous applications are found for the invention in the field of electric vehicles.

It must be understood that the invention is in no way limited to the embodiments described and illustrated, which have been given only by way of an example.

What is claimed is:

1. A device for regenerating zinc from an alkaline zincate solution which is in contact with at least two electrodes connected to a D. C. generator so that the zinc particles are deposited on the negative electrode and the oxygen is evolved at the positive electrode, and wherein said method comprises alternating period steps including a deposition step in which the solution is conveyed past the negative electrode in a first direction at a speed which is sufficiently low for the zinc particles to be deposited thereon, and detachment step in which the solution is conveyed past the negative electrode in the opposite direction at a speed which is sufficiently high for the previously-deposited zinc particles to be detached from the negative electrode, said device comprising:
   a tubular pipe for conveying of said alkaline zincate solution for the regeneration of the zinc,
   said negative electrode being disposed substantially on the axis of said tubular pipe,
   said tubular pipe being made of an impervious insulative material,
   said positive electrode being disposed in the form of a layer on the inner surface of said tubular pipe, said positive electrode being made of a porous conductive material including nickel for effecting the evolution of oxygen thereat, said negative electrode being formed by metal protrusions whose ends are disposed substantially on the axis of said tubular pipe, said protrusions being connected to a base disposed on the outside of and in contact with said tubular pipe and being partially covered with an insulative layer, and said base being totally covered with said insulative layer.

2. A device according to claim 1, wherein said tubular pipe has a complete circular cross-section, whereas said positive electrode has a cross-section in the form of an arc of a circle delimited by an angle at the centre at least equal to 180° and whose bisector is substantially vertical, so that the surface of the pipe not covered by the positive electrode is at the lower part.

3. A device according to claim 1, wherein said tubular pipe as well as said positive electrode have a complete circular cross-section, a layer of impervious insulative material being deposited on the lower part of said positive electrode and having a cross-section in the form of an arc of a circle delimited by an angle at the centre at the most equal to 180° and whose bisector is substantially the vertical.

4. A device according to claim 1, wherein said protrusions have a tapered end.

5. A device according to claim 1, wherein said protrusions have a substantially plane end.

6. A device according to claim 1, wherein said negative electrode is made of a conductive material having firstly a high hydrogen overpressure and secondly being free from inclusions of elements which are liable to form intermetallic compounds with zinc.

7. A device according to claim 6, wherein said negative electrode material comprises magnesium.

* * * * *